Patented Jan. 26, 1937

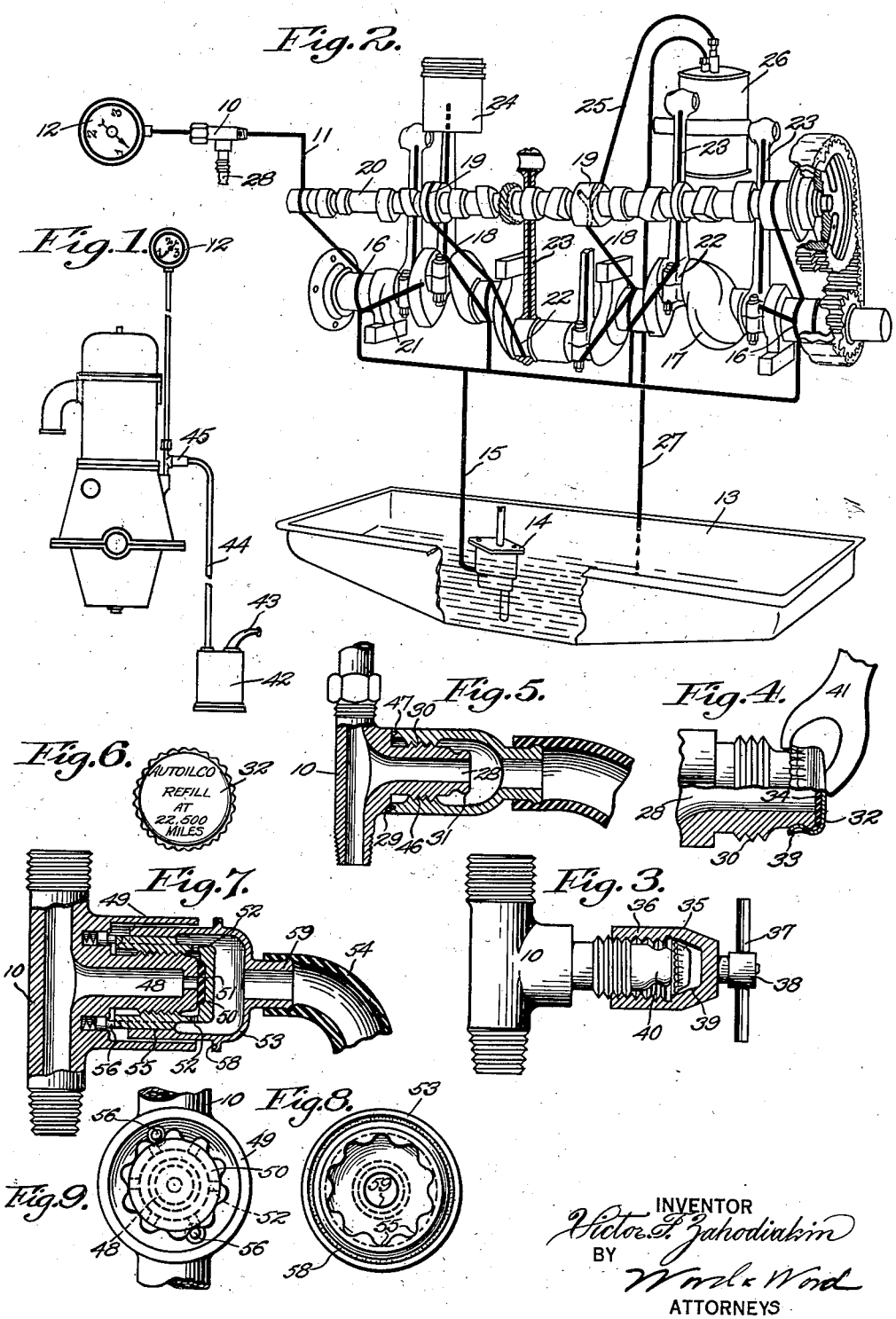

2,068,727

UNITED STATES PATENT OFFICE 2,068,727

LUBRICATION SYSTEM

Victor F. Zahodiakin, Cincinnati, Ohio

Application November 21, 1932, Serial No. 643,683

3 Claims. (Cl. 184—1.5)

This invention relates to lubrication and is particularly directed to an improvement in the lubricating system for an internal combustion engine, which improvement is used in the operation of changing the oil in the system. In the conventional lubrication system for an engine the oil is contained in a crank case, which functions as a reservoir, in quantity approximating several gallons. The oil is pumped from the crank case through a plurality of pipe lines to various parts of the engine, as for example, the crank shaft, main bearings, piston rod bearings, wrist pins, cam shaft, etc., and is then returned to the crank case for completing the circuit.

Periodic and complete changes of oil are necessary for efficient lubrication. To accomplish this the oil heretofore has been drained from the crank case by way of a plug hole in the bottom of the crank case. Drainage in this manner, as will be apparent, does not clean out all the oil and particles from the pipe lines and bearings since the flow of the oil from the reservoir through the hole is by gravity and the oil has a tendency to remain in the lines of the pump and the various bearings. Moreover the operation of drainage represents an arduous operation since the attendant must service beneath the car to reach the drain plug, this being accomplished by crawling under the car, by elevating the car, or by using a drain pit.

It is, therefore, an object of this invention to provide for the drainage of oil from the system by way of an outlet in a distributing line while the motor is operating and consequently under the line pressure induced by the pump which causes an ejection of oil under force and complete displacement of all oil from the lines, pump and bearings. The pumping pressure effectively scavenges or flushes the parts and all oil is evacuated in a much shorter time than that ordinarily consumed in the conventional gravity drainage from a plug hole in the crank case.

It is a further object of this invention to provide an efficient and quickly manipulated closure for the oil outlet in the distributing line and a quickly and conventionally coupled drain hose and equipment, whereby the attendant at the oil station can readily remove the oil for refilling purposes.

It is a further object of this invention to provide a special closure for the outlet which must be destroyed in the act of removing the same for each change of oil and to provide in this way an oil change means which requires special servicing.

It is another object to provide an oil removal outlet in which the closure is locked against unwarranted opening and in conjunction with which a complementary or cooperating drainage hose coupling is necessary for opening the closure and coincidentally effecting a complete couple of the drainage hose over the opened outlet.

Other objects and further advantages will be more fully apparent from a description of the accompanying drawing, in which:

Figure 1 is an end view of an internal combustion engine showing the oil drain device of this invention incorporated therein and a drain bucket attached thereto.

Figure 2 is a diagrammatic perspective view of the operating parts of an engine and its lubricating system including the drain means of this invention.

Figure 3 is a view of the drain fitting detached from the system showing a cap in the process of being fixed on the outlet, the attaching appliance or capper being shown in section.

Figure 4 is a fragmentary partially sectional view of the outlet showing the cap in place and illustrating the tool for removing the same.

Figure 5 is a sectional view of the fitting showing the drain tube coupled thereto after removal of the cap.

Figure 6 is a face view of a cap showing oil change data printed thereon.

Figure 7 is a sectional view of a modified form of fitting and drain coupling.

Figure 8 is a front view of the drain coupling shown in Figure 7.

Figure 9 is a front view of the outlet end of the fitting.

The drainage of the oil pumped and circulated from the crank case of the gas engine to the various bearings of the engine is accomplished by means of an outlet fitting interposed in one of the distributing conduits. The oil is drained while the engine is running the pump thereby acting for pressure circulation and consequently complete ejection of the contents of the system and crank case by way of the outlet fitting.

Referring to the drawing the outlet fitting 10 is inserted in a distributing line 11 leading to the oil gauge 12. The perspective view, Figure 2 shows in diagram, the conduit system. The crank case 13 contains the oil supply and has a pump 14 driven from the engine (not shown) mounted therein. From this pump a pipe 15 branches to the main bearings 16 of the crank shaft 17. From the main bearings, pipes 18 extend to the bearings 19 of the cam shaft 20. Also the passageways 21 extend from the main bearings 16 through the crank shaft to the piston rod bearings 22 through the piston rods 23 to the wrist pins in the pistons. A pipe 25 extends from one bearing to an oil filter 26 and a return pipe 27 extends from the filter to the crank case. This system described is typical and is described for the purpose of disclosing the application of this invention. Although shown applied in one line, namely that to the gauge, the fitting will readily attach in any of the distributing lines above disclosed.

The fitting used is a T. The right angle extension of the T is in the form of a nipple or outlet 28. The nipple includes an inner shoulder 29, raised screw threads 30 intermediately, and a bead 31 at its extreme end.

The end of the nipple is normally closed by means of a cap 32 which is clinched over the bead. The cap has a corrugated rim 33 which aids in the crimping or compressing of the edge over the bead. A packing or sealing disc 34 is fitted in the bottom of the disc, and engages on the end of the nipple for sealing the same.

The cap is attached by means of a tool 35. This tool has a thimble shaped body 36 including internal screw threads, which body is screwed onto the nipple. The thimble is rotated by means of a cross bar 37 disposed through a stud 38 fixed to and extending axially from the thimble. The cap to be fixed is inserted in the closed end of the thimble and initially rests at the large end of a generally tapered bore 39. This tapered bore includes a raised curved intermediate portion which as it is forced against the rim of the cap and in passing the rim forces the rim over the bead and clinches it in the groove 40 in back of the bead, whereupon the tool 35 is readily unscrewed.

In removing the cap, a cap lifter 41 as shown in Figure 4 may be used. Removal of the cap destroys the same and it is necessary to replace with an entirely new cap for an oil tight closure. It is contemplated that the service station servicing cars equipped with the present invention will stock a supply of caps bearing the name of the service station for replacement. The fitting can be placed in a distributing line of the oil system by disconnecting a union or coupling somewhere in the line and inserting the fitting, which work can be performed by the service station operator.

After the cap has been removed with the engine stopped, the oil is removed through a drainage equipment of the following nature: An oil bucket 42 is provided including an outlet spout 43 for emptying the can and an inlet or crank case drainage hose 44 of suitable length extending from the can and including a coupling 45 at its outer end. The coupling 45 has raised internal screw threads 46 for cooperating with the screw threads on the nipple and includes a circular packing ring 47 in its outer end adapted to abut the shoulder 29 of the nipple, thus sealing the connection at this point. The coupling includes a chamber sufficient for clearing the end of the nipple, whereby there is no obstruction to flow of oil from the nipple to the coupling and hose of the can.

The fitting is installed for instance by a service station and the component parts, namely the caps, capping tool, decapping tool and the drainage hose and can or bucket are accessories or equipment of the service station, which are necessary to drainage and refilling operations in connection with the fitting. Assuming that the device is in use on the car and has been properly capped, the motorist desiring a change of oil drives to the particular station giving the service for this system. The attendant removes the cap having first stopped the motor. He then screws the coupling of the drainage apparatus on the nipple and starts the motor. All of the oil in the crank case and system is completely pumped out by way of the fitting and the conduits and bearings are effectively flushed or scavenged under the action of drainage under pressure. When all the oil has been ejected through the fitting the attendant then removes the drainage hose and recaps the nipple with a new cap, this cap bearing the name of the individual or company operating the station with instructions as to the time at which another change of oil should be made.

The fitting 10 inserted in the line includes an outlet passageway of ample diameter so as not to constrict the flow of oil therefrom. The outlet or drain hose coupling is also inclusive of passageways of ample diameter for full clearance as the oil is ejected so that there is no tendency to retard the evacuating operation. In the particular instance disclosed for illustrating one application of the invention, the fitting is in the distributing line leading to the oil gauge, which line extends from a main distributing line. The ejection of oil from the outlet in this line syphons or draws the oil from all of the branch lines so that the most efficient cleansing action and removal of oil is accomplished. Any line of the system which it is desired to cut off from the drainage or ejection action through the outlet may be controlled by means of a check valve.

A modified form of discharge fitting and coupling means is shown in Figures 7 to 9 inclusive. In this form in addition to and surrounding the discharge nipple 48 for the fitting, a sleeve flange 49 is provided. A valve element 50 of thimble form is screwed on the nipple and includes a rubber seat 51 in the bottom of the thimble, the rubber seat being in the form of a disc engaging over the apertured end of the nipple.

The valve is closed by screwing the valve against the nipple outlet and is opened by unscrewing the same and permitting the oil to flow from the nipple outlet through radial apertures 52 in the base of the thimble 50 and thence through a coupling and valve operating element 53 at the end of a drain hose 54. The valve element includes a series of longitudinal flutes 55 disposed around its side and is held against unauthorized displacement or screwed movement from seated or nipple closing position by means of spring urged detents 56 mounted in the fitting in the base of the circular groove formed by the nipple and sleeve flange and acting outwardly and longitudinally between the flutes. Normally these detents have their tips inserted between the flutes and rotation of the valve is impossible except by means of a special coupling as hereinafter described.

The special coupling element 53 has internal flutes corresponding to those of the valve and cooperating therewith, whereby the thimble like coupling may be slipped over the valve within the sleeve flange 49 and will move the detents from operative position to positions clear of the valve by engagement of the inner end of the coupling therewith, this permitting rotation of the valve movement from its seat. At the time that the detents are displaced, a circumferential flange 57 on the outside of the coupling, including a packing ring 58 in its contact or inner face, abuts the outer end of the sleeve flange and effects a seal at this point preventing oil leakage when the valve is unseated.

The hose is coupled to a nipple 59 at the outer end of the coupling element and connects to a drain bucket of the nature previously described. The coupling element therefore functions as a key for opening the valve and at the same time accomplishes a drain connection. Unless the attendant at the station is equipped with this cooperative coupling and valve operating element, he will be unable to open the valve and effect a couple to the nipple for drainage.

Having described my invention, I claim:

1. In combination with a pressure lubrication system for an internal combustion engine, a fitting including an outlet nipple mounted in one of the distributing conduits of said system, a thimble valve screwed on said nipple, said valve having longitudinal external flutes and apertures in its sides near its closure end, said fitting including a sleeve flange surrounding said valve and nipple, detents mounted in the nipple and engaged into the ends of the grooves between said flutes for preventing rotation of the valve, a coupling and key element of tube form including internal flutes cooperating with the flutes of the valve and adapted to depress the detents clear of the valve, whereby the valve may be rotated, said coupling element including a flange for sealing engagement with the end of said sleeve flange, and a discharge tube extending from said coupling.

2. In a lubrication system for an internal combustion engine, a pump, a reservoir, a plurality of distributing pipe lines extending from said pump, a fitting including an outlet nipple mounted in one of the distributing pipe lines of said system, a valve screwed on said nipple, detents mounted in the nipple and engaging the valve for normally preventing rotation of the valve, a coupling and valve operating key element adapted to actuate the detents and release the valve for rotation, whereby the valve may be rotated, said coupling element having a sealing engagement with said fitting, and a discharge tube extending from said coupling.

3. In combination with a lubrication system for an internal combustion engine including a reservoir, a pump, and a plurality of distributing pipe lines extending from the pump to the various bearings of the engine; a fitting including an outlet nipple mounted in said system, a valve for said nipple, means for preventing operation of the valve, and a coupling and valve operating key element adapted to operate the valve, said coupling element having sealing engagement with said fitting nipple.

VICTOR F. ZAHODIAKIN.